(12) United States Patent
Switzer et al.

(10) Patent No.: US 7,788,474 B2
(45) Date of Patent: *Aug. 31, 2010

(54) OPERATING SYSTEM SHUT DOWN

(75) Inventors: David Switzer, Seattle, WA (US); Huat Chye Lim, Seattle, WA (US); Lisa A. Osse, Kirkland, WA (US); William Mak, Seattle, WA (US); HyunSuk Kim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

This patent is subject to a terminal disclaimer.

(21) Appl. No.: 11/214,048

(22) Filed: Aug. 30, 2005

(65) Prior Publication Data

US 2007/0050769 A1    Mar. 1, 2007

(51) Int. Cl.
  G06F 9/48    (2006.01)
(52) U.S. Cl. .................... 713/1; 713/2; 713/100
(58) Field of Classification Search ............. 713/1, 713/2, 100
  See application file for complete search history.

(56) References Cited

U.S. PATENT DOCUMENTS

| | | | |
|---|---|---|---|
| 5,758,155 A | 5/1998 | Circenis | |
| 5,794,031 A | 8/1998 | Nakadai | |
| 5,889,988 A * | 3/1999 | Held | 718/103 |
| 6,412,074 B1 * | 6/2002 | Flannery | 713/310 |
| 6,686,934 B1 | 2/2004 | Evans et al. | |
| 6,957,363 B2 | 10/2005 | Spiegel | |
| 2002/0054141 A1 * | 5/2002 | Yen et al. | 345/804 |
| 2002/0113777 A1 | 8/2002 | Lauderdale | |
| 2003/0084276 A1 | 5/2003 | Levidow | |
| 2003/0188217 A1 * | 10/2003 | Spiegel | 714/4 |
| 2003/0236811 A1 * | 12/2003 | Green et al. | 709/100 |
| 2004/0040024 A1 | 2/2004 | Green | |
| 2004/0076177 A1 | 4/2004 | Koch et al. | |
| 2004/0199599 A1 * | 10/2004 | Nichols et al. | 709/208 |
| 2005/0278700 A1 | 12/2005 | Buskens et al. | |

OTHER PUBLICATIONS

Reliability Improvements in Windows XP Professionals Internet printout: http://www.microsoft.com/technetprodtechnol/winxppro/plan/rIbwinxp.mspx.
Shutdown manager and tools 1.0.0.43 Description Internet printout: http://www.softsland.com/Shudtown_Manager_and_Tools.html.
Windows NT/2000 Startup & Shutdown Internet printout: http://www.smartcomputing.com/editorial/article.asp?article+articles/archive/10706/10106/10106.asp.
"Expected" and "unexpected" startups and shutdowns Internet printout: http://www.technet2.microsoft.com/WindowServer/en/Library/37a74768-4917-4736-a021-94a39be536a81033.mspx.
How to Make Windows XP Shut Down Faster Internet printout: http://www.thetechzone.com/?m+show&id_489.

* cited by examiner

*Primary Examiner*—Thomas Lee
*Assistant Examiner*—Fahmida Rahman
(74) *Attorney, Agent, or Firm*—Wolf, Greenfeld & Sacks, P.C.

(57) ABSTRACT

A user interface and scheme is provided for facilitating shutting down an operating system. Aspects include the operating system receiving a command to initiate shut down, and automatically terminating graphical user interface (GUI) applications that delay shut down which do not have top level windows. Also, aspects provide a user, through a graphical user interface, the ability to automatically terminate all running applications in response to determining that a running GUI application has a top level window.

14 Claims, 3 Drawing Sheets

OPERATING SYSTEM SHUT DOWN

BACKGROUND

When a user attempts to shut down an operating system, such as the Windows XP brand operating system by Microsoft Corporation of Redmond, Wash. or the Mac OS X operating system by Apple Computer, Inc. of Cupertino, Calif., certain applications possess the ability to cancel or indefinitely block shut down. When shut down is temporarily blocked by other applications, the user experience can be unpleasant as the user may not be provided with any system generated indication of what is going on and shut down is obviously delayed.

As an example, in the Windows XP brand operating system, when a user has an unsaved document in an application such as Microsoft Word and attempts to shut down his computer, Word will display a dialog box prompting the user as to whether he desires to save the document. Assuming that Word is hung or not responding, Windows then occludes the first dialog box with a second dialog box asking the user whether he would like to end the application now (immediately) and lose any unsaved data. If the user chooses to end the application now the application closes and another running application, if one exists, will generate a similar pair of dialogs until all applications have been terminated. If the user chooses not to end the application now, the application continues closing on its own. Once completed, if the user has other running applications, the process repeats itself for each application until all the applications close. Then the system finally shuts down. From the aforementioned description, shutting down the operating system can be frustrating, tedious and most certainly longer than desired.

SUMMARY

This summary is provided to introduce a selection of concepts in a simplified form that are further described below in the Detailed Description. This summary is not intended to identify key or essential features of the claimed subject matter, nor is it intended to be used in any way to limit the scope of the claimed subject matter.

Aspects relate to providing a scheme and graphical user interface for shutting down an operating system. Some aspects include a computer readable medium storing computer-executable instructions for performing a method for shutting down an operating system. In certain aspects, the method includes receiving a command to initiate operating system shut down, and determining that there is a running graphical user interface application that has a top level window which delays shut down. Next, a user may be prompted through a graphical user interface to terminate the running graphical user interface application. Responsive to a user command to terminate the applications, the operating system automatically terminates all running applications.

In some aspects, determining that the graphical user interface application with a top level window delays shut down includes sending a shut down request to the graphical user interface application and receiving a negative response to the shut down request. In other aspects, determining that the graphical user interface application with a top level window delays shut down includes sending a shut down request to the graphical user interface application and receiving no response to the shut down request within a predetermined time period (e.g., five seconds).

In other aspects, the method for shutting down the operating system may include the steps of receiving a command to initiate operating system shut down and automatically terminating a first running graphical user interface application that accepts a shut down request, is hung or does not have a top level window. Further aspects may include determining that a second graphical user interface application with a top level window delays shut down and responsive to a user command, automatically terminating all running applications. In a still further aspect, the method may included providing a graphical user interface having a user command input region for receiving the user command in response to determining that the second graphical user interface delays shut down.

In other aspects a computer readable medium stores computer-executable instructions for generating a graphical user interface for shutting down an operating system for presentation on a display. The graphical user interface according to some aspects includes an application region identifying at least one instance of an application that delays shut down, a shut down object, which responsive to selection causes the operating system to terminate all running applications, and a cancel object, which responsive to selection causes the operating system to cancel shut down. According to some aspects, the application region can include a title and thumbnail of the at least one instance of the application delaying shut down. In certain aspects the graphical user interface may occupy a full screen. Also, the graphical user interface may include a list of other running applications or a drop menu, which upon selection displays a list of other running applications. In other aspects, selection of the cancel object causes a shell or desktop to be displayed.

BRIEF DESCRIPTION OF THE DRAWINGS

The foregoing summary, as well as the following detailed description, is better understood when read in conjunction with the accompanying drawings, which are included by way of example, and not by way of limitation and in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Illustrative Operating Environment

Figure 1:
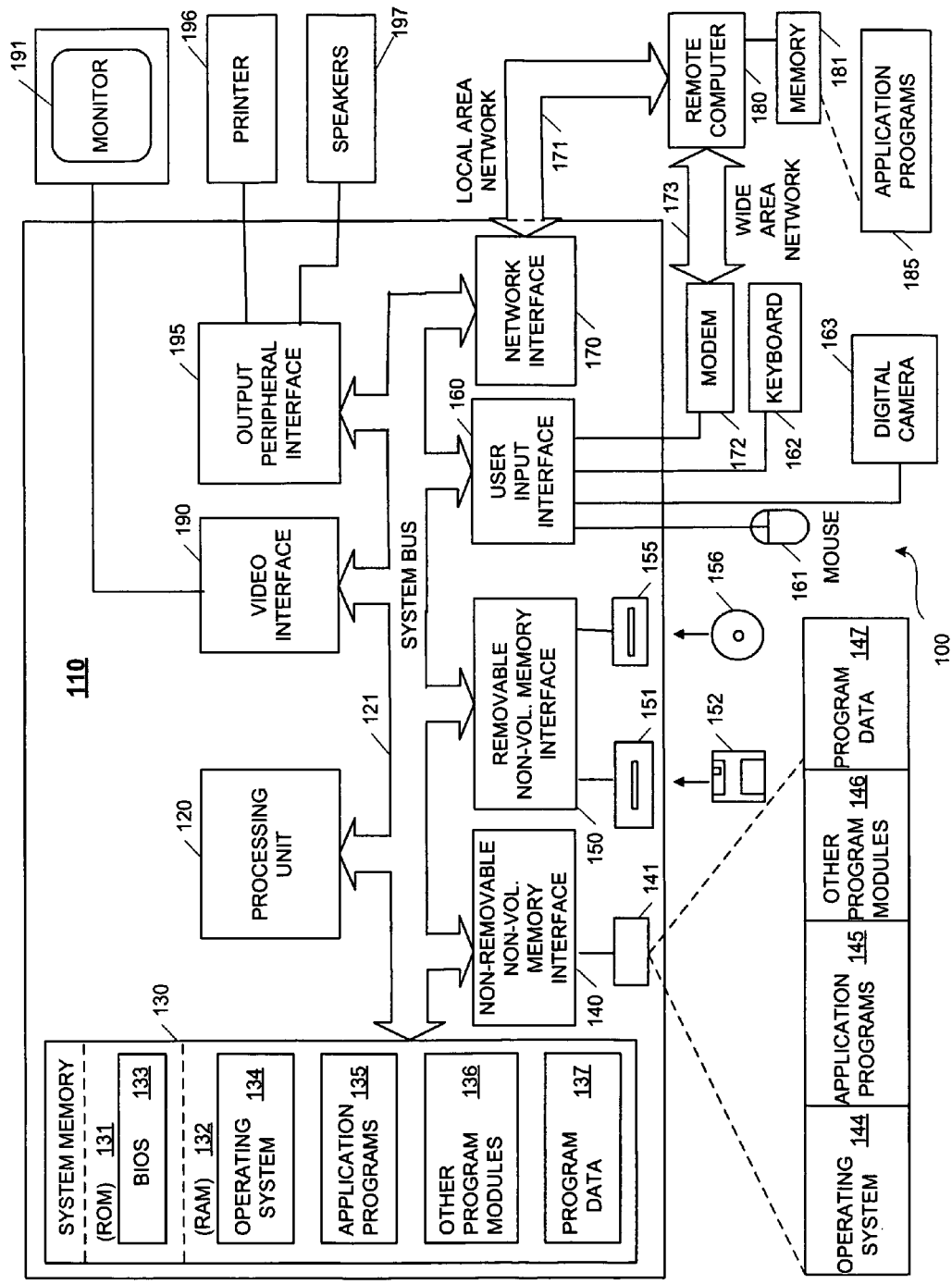
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Illustrative Aspects

The following aspects will focus on a Windows based operating system. It will be understood, however, that aspects of the invention will apply similarly to other operating systems including, but not limited to, Mac and Linux based operating systems.

Figure 2:
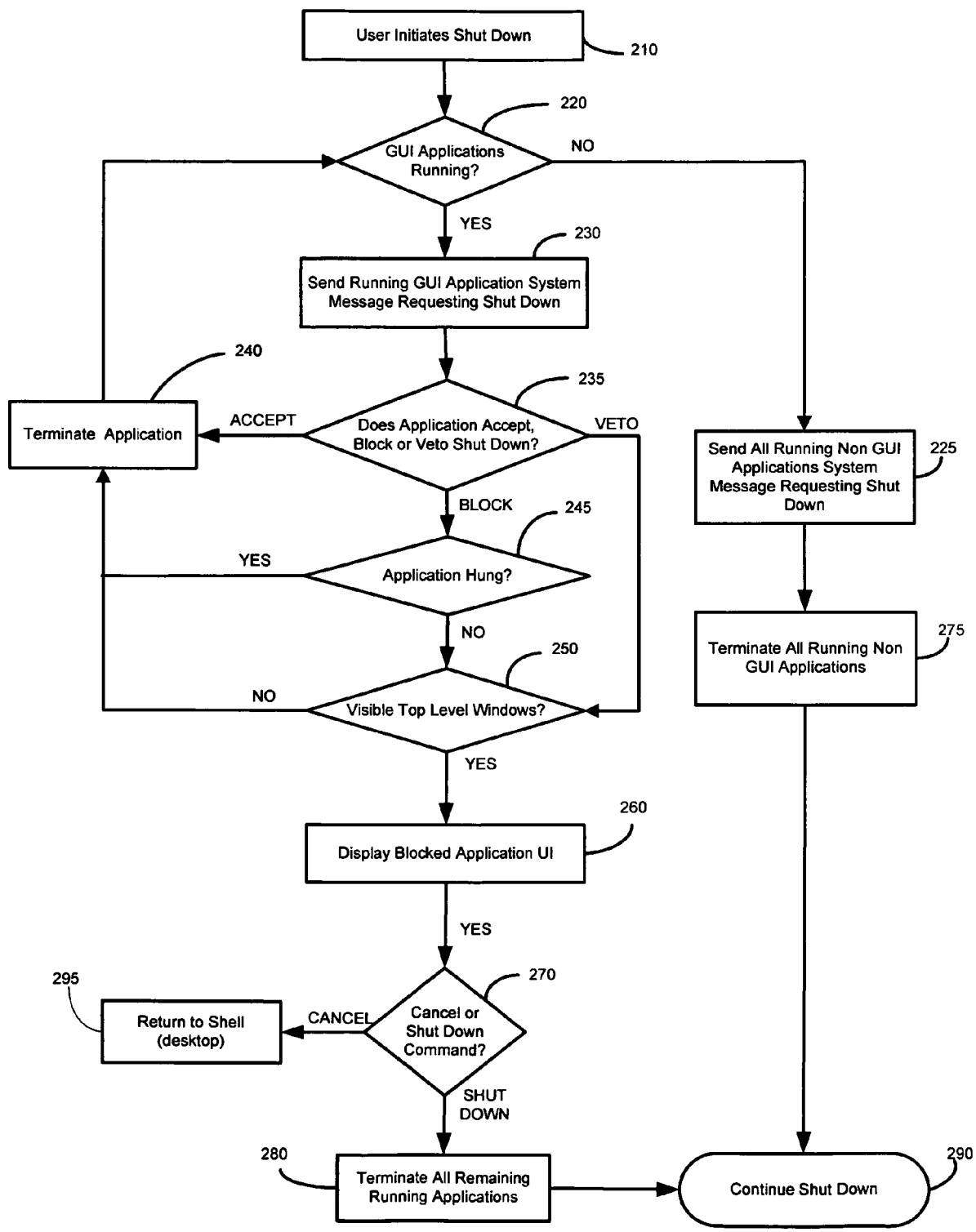
FIG. 2 is a flow chart showing an illustrative implementation according to aspects of the present invention.

FIG. 2 describes an illustrative process for shutting down an operating system. According to this example, in step 210 a user initiates shut down of the operating system in one of the available ways, such as activating a shut down command from a navigation menu. In response to the initiation of shut down, in step 220 the operating system determines whether any GUI (graphical user interface) applications are running.

There are two types of GUI applications, those that can have a top level window and those that cannot. In a computer running the Windows XP brand operating system an application that has a top level window is an application that is capable of being represented by a button in the task bar, and an application that does not have a top level window is an application that does not have a visible top level window. In the Windows XP brand operating system, an application can set a visibility flag, and if the flag is set to false, the window is considered "hidden;" a hidden window can never be displayed on the desktop and thus cannot have a visible top level window. Specific examples of applications in the Windows XP brand operating system include that do not have a top level window include Windows services applications such as the Windows Search Service. Applications which do not have top level windows may be thought of as transparent to the user in that they are running in the background unnoticed. A non GUI application is a command line or console application, which cannot make use of the operating system APIs that allow applications to provide the UI features commonly associated with the operating system such as buttons, scroll bars, multiple windows, formatted text, etc. found in Windows XP brand operating system. Also, the non GUI application cannot be represented in the system tray in a Windows XP brand operating system.

If no GUI applications are running (step 220: no), for example if the user has closed all the open applications prior to initiating shut down, the operating system proceeds to automatically terminate the remaining running non GUI applications. In step 225 a system message requesting shut down is sent to all running non-GUI applications, if any. If there were any running non GUI applications (e.g., command line applications), then they are terminated in step 275. According to one illustrative aspect, the operating system may wait up to twenty seconds and then terminate all non GUI applications irrespective of whether they responded to the request. This allows command line applications, which assent to the request, to save any necessary data and perform other cleanup as necessary. In one aspect with multiple running non GUI applications, a system message may be sent to a first running non GUI application. The first non-running GUI application will be shut down after receiving a response assenting to shut down in a predetermined time period (e.g., twenty seconds) or after the predetermined time period has elapsed. This sequence can be repeated for each running non GUI application until all are terminated. Alternatively, the system message can be sent to each running non GUI application in parallel and the operating system if it has received a positive response from each running non GUI application within a predetermined time period or after the predetermined time period has elapsed may commence termination of all applications. According to another illustrative aspect, step 225 may be eliminated such that all running non GUI applications are terminated in step 275. Next, shut down continues in step 290 until completion. The above sequence of steps allows the operating system to automatically terminate any running non GUI applications.

If at least one GUI application is still running (step 220: yes) then in step 230 the operating system sends one of the running GUI applications a system message (e.g., WM_QUERYENDSESSION in a Windows XP environment). The system message indicates to the application that a system shut down operation has been requested and requests the application to shut down. If there are multiple running GUI applications, the operating system may choose the order by which the applications will be processed, that is which application will first receive the system message. Schemes for deciding which applications to process first include starting with the application on top of the Z-order, which open application is most likely to block or veto shut down or any other heuristic associated with the applications. APIs exist in Windows brand operating system, which may be utilized to formulate a desired heuristic. In an alternative aspect, an API can be provided which allows the applications to set the order in which they wish to shut down such that shut down is carried out accordingly.

While this description discusses aspects involving sending the system message requesting shut down to applications serially in this scheme and processing each application accordingly, it will be understood that in other aspects the system message may be sent to each running GUI application contemporaneously and the applications may be processed based on the order in which they respond to the request or each application may be processed as soon their response to the system message is received.

Next in step 235, the operating system determines whether the GUI application has vetoed shut down by negatively responding to the system shut down request, blocked shut down by not responding to the request or accepted shut down by responding positively to the shut down request. If the application positively responds to the shut down request (a "no" response to step 235), then in step 240, the operating system terminates the application and control returns to step 220 to process any other running applications.

If the application does not respond to the request and is blocking shut down, then in step 245 the operating system determines whether the application is hung or if the application is purposefully not responding to the shut down request. An application is hung when the application has failed to respond to any system messages within a predefined period of time. An illustrative time period is five seconds. In an exemplary implementation using a Windows XP based operating system, the operating system determines whether the application is hung using the IsHungAppWindow( ) API. The API monitors whether the operating system has received responses to any system messages in the last five seconds. If an application is hung, then the system terminates the application in step 240 and control returns to step 220.

Some applications will respond to a shut down request almost immediately while others may take several seconds, and yet others may purposefully not respond as they continue with other data processing or the like. Applications may want to conclude processing before assenting to shut down. For example, enterprise software applications, OneNote (by Microsoft Corporation of Redmond, Wash.) and other applications which automatically save data to a network server before exiting a network may take two to three seconds to respond to a system message requesting shut down. Five seconds or a time period consistent with the amount of time it takes most applications under typical operation to respond to the system message allows most applications to be terminated normally leaving only those applications which are hung or which have purposefully not responded to the shut down request. An application may not respond to a shut down request, that is block shut down, because additional data processing may still need to be performed or for other reasons. Applications generally block when they know they will respond eventually, but are not ready to respond yet. For example, if Microsoft Word or Notepad have unsaved data and are asked to shut down, they may block shut down because they would like the user to indicate whether she would like to save the data. Word and Notepad know that they will respond "OK to shut down" eventually, but only after the user has indicated what she would like to do with the unsaved data.

If an application is not hung (a "no" response in step 245) or the application vetoes the shut down request in step 235, then application is delaying shut down. In response to a "no" response in step 245 or a "veto" in step 235, the operating system determines whether the GUI application has any visible top level windows in step 250. An application may veto a shut down request for any reason it likes such as that it requires more time to complete processing such as when the application is performing an activity in the "real world" that cannot be interrupted. For example, when a CD-burning application is in the middle of writing to a CD, it cannot be interrupted. If interruption were allowed, the CD would be rendered useless. Consequently, a CD-burning application would typically veto shut down in this case. An application being used to drive a mechanical precision tool in the middle of a complex, non-interruptible operation might also veto shutdown for the same reason. If the application has no visible top level windows then the operating system terminates the application in step 240 and control returns to step 220. Through this operation, GUI applications that do not have top level windows can be terminated automatically.

If the application has a top level window, then the blocking (and vetoed) application user interface (UI) is displayed in step 260. According to one aspect, the blocked (and vetoed) application UI takes up a full display screen. With a full screen UI, the display is less cluttered than with existing blocking application UIs in the Windows XP brand operating system and the Mac OS X brand operating system. In Windows XP, in response to a shut down command a blocking application UI consisting of a dialog box is displayed, which overlays the blocking application window and the remainder of the windows in the Z-order on the user's desktop. By removing this clutter, the user experience may be enhanced as the user will be less confused and able to clearly focus on the blocked application. Although a full screen UI may be advantageous, a partial screen UI is considered to be appropriate as well.

Figure 3:
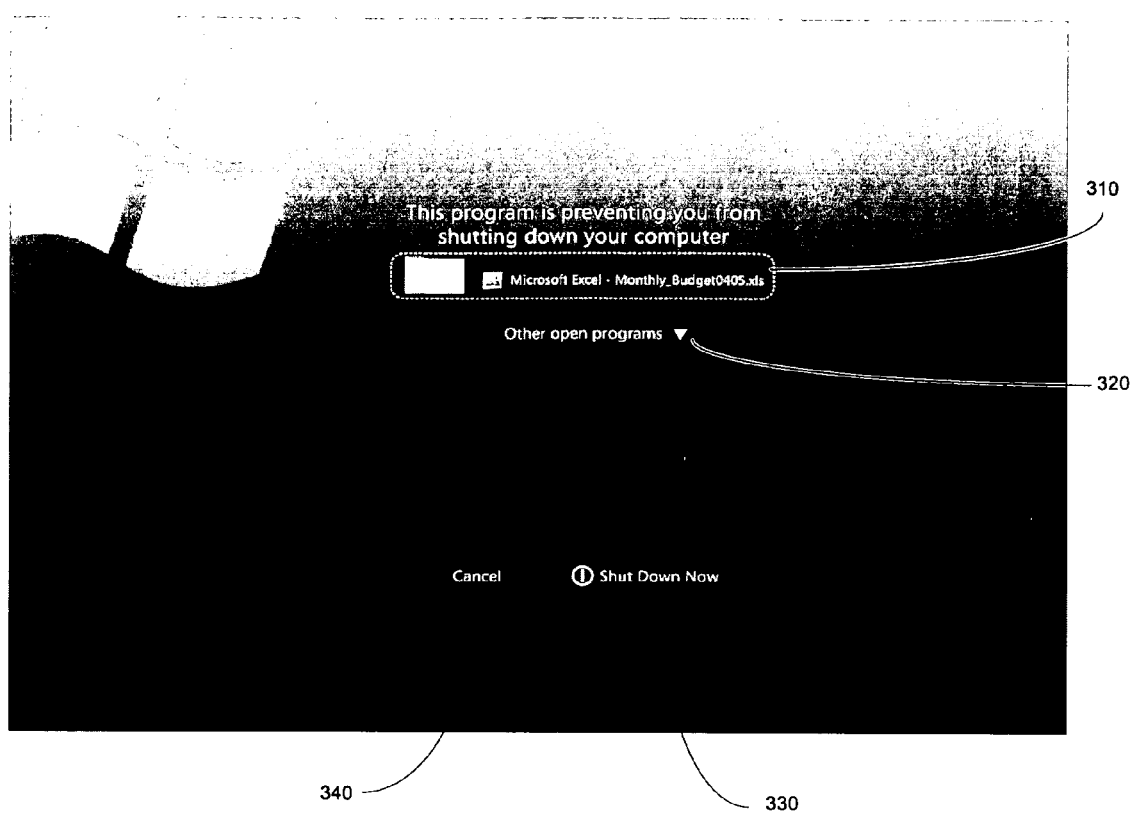
FIG. 3 is an illustrative UI for a blocked application according to aspects of the present invention.
Figure 4:
FIG. 4 is an illustrative UI for a blocked application according to aspects of the present invention.

An illustrative full screen UI is shown in FIG. 3. Referring to FIG. 3, in region 310 a window title and window thumbnail of each instance of the application blocking shut down is presented on the user interface. In this example, only a single instance of the application is running. A drop down menu 320 is available to allow a user to display a list of other open programs which have not shut down in the event the user would like to know what other programs will be shutting down without saving any data. An example of a list 410 in a drop down menu or a UI with a list is depicted in FIG. 4. Also, the UI provides two objects a "Shut Down Now" button 330 that permits a user to terminate all running applications and force system shut down, and a "Cancel" button 340 that allows a user to cancel the shut down operation.

After the UI is displayed, the system waits for the user to select the "Cancel" button or "Shut Down Now" button in step 270. If the user selects the "Shut Down Now" button, in step 280 the operating system terminates all remaining running applications including the subject GUI application irrespective of whether any application may block or veto shut down and without saving any data. Although not shown, the UI may include a message that indicates that selection of the "Shut Down Now" command will cause all unsaved data to be lost. Thereafter, the shutdown process continues until completion in step 290. In response to the "Shut Down Now" command, all GUI applications can be instantly terminated and all non GUI (command line) applications can be informed shut down is underway and be terminated if they do not immediately initiate shut down. The "Shut Down Now" button allows the user to automatically force shut down of all applications with a single click or selection avoiding the need to individually shut down each application. This may reduce user frustration and simplify the shut down operation for many users. If the user selects the "Cancel" button in step 270, in step 295 the operating system cancels shut down and returns the UI to the shell, e.g., the Windows desktop in a Windows based operating system.

Ultimately before the completion of steps 250, 260 and 270, a blocking application may send a response to the shut down request. In this instance, system operation is interrupted and if the application assents to application shut down, control shifts to step 240 where the application is terminated or if the application vetoes the shut down request, the process continues or alternatively, control could return to step 235.

Nearly all the applications that a user may be concerned with, primarily those with unsaved data, have top-level windows. By automatically terminating applications that do not have top-level windows including the non GUI applications processed in steps 225 and 275, the number of blocking applications, which are brought to the attention of the user can be significantly reduced. As such, the time required for system shut down and the associated user aggravation and frustration may be reduced.

According to certain aspects, one of the benefits that may be realized includes the reduction of the types of applications that may block or veto shut down. Also, certain aspects may improve the user experience associated with applications blocking shut down and may remove some of the more confusing aspects associated with the shut down user experience.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A computer readable storage medium storing computer-executable instructions for performing a method for shutting down an operating system, the method comprising the steps of:
   receiving a command to initiate operating system shut down;
   sending a shut down request to a graphical user interface application without a top level window;
   receiving no response to the shut down request with a predetermined period of time;
   determining that the graphical user interface application without the top level window is not hung;
   automatically terminating the graphical user interface application without the top level window;
   determining whether any graphical user interface applications with a top level window delay shut down;
   prompting a user for a user command to selectively shut down the graphical user interface applications with the top level window that delay shut down after determining that the graphical user interface applications with the top level window delay shut down; and then
   after the determining step, automatically terminating all running applications responsive to the user command received from the user that has been prompted.

2. The computer readable storage medium according to claim 1, wherein the step of determining whether any graphical user interface applications with the top level window delay shut down includes sending shut down requests to the graphical user interface applications and receiving negative responses to the shut down requests.

3. The computer readable storage medium according to claim 1, wherein the step of determining whether any graphical user interface applications with the top level window delay shut down includes sending shut down request to the graphical user interface applications and receiving no responses to the shut down request within a predetermined time period.

4. The computer readable storage medium according to claim 3, wherein the method further comprises the step of receiving a response to another system request within the predetermined time period.

5. The computer readable storage medium according to claim 1, wherein the method further comprises the step of providing a graphical user interface prompting the user for the user command.

6. The computer readable storage medium according to claim 5, wherein the graphical user interface occupies a full screen.

7. The computer readable storage medium according to claim 5, wherein an application user interface presents a list of other running applications.

8. The computer readable storage medium according to claim 5, wherein an application user interface presents a title and thumbnail of at least one instance of the application delaying shut down.

9. The computer readable storage medium according to claim 1, wherein the method, prior to determining whether any graphical user interface applications with the top level window delay shut down, further comprises:
   sending a shut down request to a second graphical user interface application;
   receiving a positive response to the shut down request; and
   terminating the second graphical user interface application.

10. The computer readable storage medium according to claim 1, wherein the method, prior to determining whether any graphical user interface applications with the top level window delay shut down, further comprises:
    determining that a second graphical user interface application is hung; and
    automatically terminating the second graphical user interface application.

11. A computer readable storage medium storing computer-executable instructions for performing a method for shutting down an operating system, the method comprising in order the steps of:
    receiving a command to initiate operating system shut down;
    automatically terminating running graphical user interface applications that accept a shut down request, that are hung, and that do not have a top level window;
    determining whether any graphical user interface applications with a top level window delay shut down;
    prompting a user for a user command to selectively shut down one or more of the graphical user interface applications with the top level window that delay shut down after determining that the one or more of the graphical user interface applications with the top level window delay shut down; and then
    automatically terminating all running applications responsive to the user command received from the user that has been prompted.

12. The computer readable storage medium according to claim 11, wherein the method further includes, responsive to the step of determining, display an application user interface for identifying multiple user interface applications and providing a user command input region for receiving the user command.

13. The computer readable storage medium according to claim 11, wherein the method further includes:
    sending the shut down request to a first graphical user interface application; and determining that the first graphical user interface application accepts or is hung based on the response to the shut down request.

14. A computer readable storage medium storing computer-executable instructions for performing a method for shutting down an operating system, the method comprising the steps of:

receiving a command to initiate operating system shut down;

sending a shut down request to a graphical user interface application without a top level window;

receiving no response to the shut down request within a predetermined period of time;

determining that the graphical user interface application without the top level window is not hung; and automatically terminating the graphical user interface application without the top level window; then determining whether any graphical user interface applications with a top level window delay shut down;

prompting a user for a user command to selectively shut down the graphical user interface applications with the top level window that delay shut down after determining that the graphical user interface applications with the top level window delay shut down; and after the determining step, automatically terminating all running applications responsive to the user command.

* * * * *